United States Patent
Srirangam Narashiman et al.

(10) Patent No.: US 10,867,195 B2
(45) Date of Patent: Dec. 15, 2020

(54) SYSTEMS AND METHODS FOR MONITORING DRIVER STATE

(71) Applicant: Microsoft Technology Licensing, LLC, Redmond, WA (US)

(72) Inventors: Akshay Uttama Nambi Srirangam Narashiman, Bengaluru (IN); Venkata N. Padmanabhan, Bengaluru (IN); Ishit Mehta, Hyderabad (IN); Shruthi Bannur, Bengaluru (IN); Sanchit Gupta, Bengaluru (IN)

(73) Assignee: Microsoft Technology Licensing, LLC, Redmond, CA (US)

( * ) Notice: Subject to any disclaimer, the term of this patent is extended or adjusted under 35 U.S.C. 154(b) by 229 days.

(21) Appl. No.: 15/994,820

(22) Filed: May 31, 2018

(65) Prior Publication Data

US 2019/0279009 A1     Sep. 12, 2019

Related U.S. Application Data

(60) Provisional application No. 62/641,855, filed on Mar. 12, 2018.

(51) Int. Cl.
*G06K 9/00* (2006.01)
*G06T 7/246* (2017.01)
(Continued)

(52) U.S. Cl.
CPC ..... *G06K 9/00845* (2013.01); *G06K 9/00255* (2013.01); *G06K 9/00315* (2013.01);
(Continued)

(58) Field of Classification Search
CPC .......... G06K 9/00845; G06K 9/00315; G06K 9/6218; G06K 9/6257; G06K 9/6289;
(Continued)

(56) References Cited

U.S. PATENT DOCUMENTS

| | | | |
|---|---|---|---|
| 2003/0053664 A1* | 3/2003 | Pavlidis | G06K 9/00228 382/117 |
| 2013/0250108 A1* | 9/2013 | Du | G06K 9/00221 348/148 |

(Continued)

OTHER PUBLICATIONS

H. Zhang, V. M. Patel, B. S. Riggan and S. Hu, "Generative adversarial network-based synthesis of visible faces from polarimetrie thermal faces," 2017 IEEE International Joint Conference on Biometrics (IJCB), Denver, CO, 2017, pp. 100-107, doi: 10.1109/BTAS.2017.8272687. (Year: 2017).*

(Continued)

*Primary Examiner* — Van D Huynh
(74) *Attorney, Agent, or Firm* — Schwegman Lundberg & Woessner, P.A.

(57) ABSTRACT

Systems and techniques for monitoring driver state are described herein. In an example, a driver state monitoring system is adapted to receive a set of color images of a person, such as images of a driver of a vehicle with varying levels of illumination in the images. The driver state monitoring system may be further adapted to generate a set of synthesized thermal images from the set of color images. The driver state monitoring system may be further adapted to use a trained thermal image face detector to locate a human face in the synthesized thermal images. The driver state monitoring system may be further adapted to use a trained thermal image facial landmark predictor to locate facial landmarks in the synthesized thermal images. The driver state monitoring system may be further adapted to analyze the facial landmarks in the synthesized thermal images to determine facial feature movements.

18 Claims, 12 Drawing Sheets

(51) Int. Cl.
*G06T 7/73* (2017.01)
*G06K 9/62* (2006.01)

(52) U.S. Cl.
CPC ......... *G06K 9/6218* (2013.01); *G06K 9/6257* (2013.01); *G06K 9/6289* (2013.01); *G06T 7/248* (2017.01); *G06T 7/74* (2017.01); *G06T 2207/10024* (2013.01); *G06T 2207/10048* (2013.01); *G06T 2207/20076* (2013.01); *G06T 2207/20081* (2013.01); *G06T 2207/20084* (2013.01); *G06T 2207/20212* (2013.01); *G06T 2207/30201* (2013.01); *G06T 2207/30268* (2013.01)

(58) Field of Classification Search
CPC .. G06K 9/00255; G06K 9/2018; G06T 7/248; G06T 7/74; G06T 2207/20084; G06T 2207/20212; G06T 2207/10048; G06T 2207/10024; G06T 2207/20076; G06T 2207/30201; G06T 2207/30268; G06T 2207/20081
USPC ........................................................ 382/103
See application file for complete search history.

(56) References Cited

U.S. PATENT DOCUMENTS

| | | | | |
|---|---|---|---|---|
| 2013/0265227 | A1* | 10/2013 | Julian | G06F 3/04812 345/157 |
| 2017/0195562 | A1* | 7/2017 | Desai | H04N 5/23238 |
| 2017/0316285 | A1* | 11/2017 | Ahmed | G06K 9/6223 |
| 2018/0075581 | A1* | 3/2018 | Shi | G06N 3/0472 |
| 2018/0116579 | A1* | 5/2018 | Omi | A61B 5/6893 |
| 2019/0197330 | A1* | 6/2019 | Mahmoud | G08G 1/096725 |

OTHER PUBLICATIONS

J. Choe, S. Park, K. Kim, J. H. Park, D. Kim and H. Shim, "Face Generation for Low-Shot Learning Using Generative Adversarial Networks," 2017 IEEE International Conference on Computer Vision Workshops (ICCVW), Venice, 2017, pp. 1940-1948, doi: 10.1109/ICCVW.2017.229. (Year: 2017).*
"A Cost-Effective Implementation of the Blind Spot Detection Warning Module", In White Paper of L&T Technology Services, Sep. 2015, pp. 1-12.
"Advanced Driver Assistance Systems (ADAS) Market", Retrieved from: https://industryarc.com/Report/20/advanced-driver-assistance-systems-market.html, Retrieved on: Feb. 26, 2018, 4 Pages.
"Cambridge Mobile Telematics", Retrieved from: https://www.cmtelematics.com/, Retrieved on: Feb. 26, 2018, 8 Pages.
"Driver Drowsiness Detection system", Retrieved from: http://www.tataelxsi.com/industries/automotive/automotive-electronics/casestudies/driver-drowsiness-detection-system.html, Retrieved on: Feb. 26, 2018, 5 Pages.
"Flir one for android", Retrieved from: http://www.flir.com/flirone/pro/, Retrieved on: Feb. 26, 2018, 9 Pages.
"Global Health Observatory (GHO) data", Retrieved from: http://www.who.int/gho/road_safety/mortality/en/, Retrieved on: Feb. 26, 2018, 1 page.
"Panasonic Develops Drowsiness-Control Technology by Detecting and Predicting Drivers Level of Drowsiness", Retrieved from: http://news.panasonic.com/global/press/data/2017/07/en170727-3/en170727-3.pdf, Jul. 27, 2017, 4 Pages.
"Road traffic injuries", Retrieved from: http://www.who.int/mediacentre/factsheets/fs358/ent, Retrieved on: Feb. 26, 2018, 6 Pages.
"Zen Drive", Retrieved from: https://www.zendrive.com/, Retrieved on: Feb. 26, 2018, 7 Pages.
Abtahi, et al., "A yawning measurement method using embedded smart cameras", In Proceedings of IEEE International Instrumentation and Measurement Technology Conference, May 6, 2013, 4 Pages.
Abtahi, et al., "Yawdd: A yawning detection dataset", In Proceedings of the 5th ACM Multimedia Systems Conference, Mar. 19, 2014, pp. 24-28.
Alekhin, et al., "Open Source Computer Vision Library", Retrieved from: https://github.com/opencv/opencv, Retrieved on: Feb. 26, 2018, 3 Pages.
Baltrusaitis, et al., "Constrained Local Neural Fields for robust facial landmark detection in the wild", In Proceedings of the IEEE International Conference on Computer Vision Workshops, Dec. 2, 2013, pp. 1-8.
Belhumeur, et al., "Localizing Parts of Faces Using a Consensus of Exemplars", In Journal of IEEE Transactions on Pattern Analysis and Machine Intelligence, vol. 35, No. 12, Dec. 2013, pp. 545-552.
Bergasa, et al., "Real-time system for monitoring driver vigilance", In Journal of IEEE Transactions on Intelligent Transportation Systems, vol. 7, Issue 1, Mar. 2006, pp. 63-77.
Bo, et al., "Detecting Driver's Smartphone Usage via Nonintrusively Sensing Driving Dynamics", In Journal of IEEE Internet of Things Journal, vol. 4, No. 2, Apr. 2017, pp. 340-350.
Cascia, et al., "Fast, reliable head tracking under varying illumination—An approach based on registration of texture-mapped 3d models", In Journal of IEEE Transactions on Pattern Analysis and Machine Intelligence, vol. 22, No. 4, Apr. 2000, pp. 322-336.
Chen, et al., "Invisible Sensing of Vehicle Steering with Smartphones", In Proceedings of the 13th Annual International Conference on Mobile Systems, Applications, and Services, May 18, 2015, 13 Pages.
Chu, et al., "I am a smartphone and I know my user is driving", In Proceedings of Sixth International Conference on Communication Systems and Networks, Jan. 6, 2014, 8 Pages.
Cootes, et al., "Active appearance models", In Journal of IEEE Transactions on Pattern Analysis and Machine Intelligence, vol. 23, Issue 6, Jun. 2001, pp. 681-685.
Craye, et al., "Driver distraction detection and recognition using RGB-D sensor", In Journal of Computing Research Repository, Feb. 2015, pp. 1-11.
Cristinacce, et al., "Feature detection and tracking with constrained local models", In Proceedings of the British Machine Vision Conference, vol. 1, No. 2, Sep. 4, 2006, pp. 1-10.
D'Orazio, et al., "A visual approach for driver inattention detection", in Journal of Pattern Recognition, vol. 40, Issue 8, Aug. 2007, pp. 2341-2355.
Dalal, et al., "Histograms of oriented gradients for human detection", In Proceedings of IEEE Computer Society Conference on Computer Vision and Pattern Recognition, Jun. 20, 2005, 8 Pages.
King, Davis, "Dlib 18.6 released—Make your own object detector!", Retrieved from: http://blog.dlib.net/2014/02/dlib-186-released-make-your-own-object.html, Feb. 3, 2014, 45 Pages.
Dunoyer, Alain, "Automotive ADAS Challenges & Opportunities Ahead", Retrieved from: http://aesin.org.uk/wp-content/uploads/2013/07/Alain-Dunoyer-SBD-AESIN-2013.pdf, Jul. 2013, 11 Pages.
Gallup, et al., "Yawn duration predicts brain weight and cortical neuron number in mammals", In Journal of Biology letters, vol. 12, Issue 10, Oct. 2016, pp. 1-4.
Galvanek, et al., "Automated facial landmark detection, comparison and visualization", In Proceedings of the 31st spring conference on computer graphics, Apr. 22, 2015, pp. 7-14.
Goodfellow, et al., "Generative Adversarial Nets", In Proceedings of Advances in Neural Information Processing Systems, Dec. 8, 2014, pp. 1-9.
Gross, et al., "Multi-PIE", In Proceedings of 8th IEEE International Conference on Automatic Face Gesture Recognition, Sep. 2008, 8 Pages.
Grundmann, et al., "Auto-directed video stabilization with robust L1 optimal camera paths", In Proceedings of IEEE Conference on Computer Vision and Pattern Recognition, Jun. 20, 2011, pp. 225-232.
Haq, Husna, "Can a smart steering wheel reduce car accidents?", Retrieved from: https://www.csmonitor.com/Technology/2015/0714/Can-a-smart-steering-wheel-reduce-car-accidents, Jul. 14, 2015, 4 Pages.

(56) References Cited

OTHER PUBLICATIONS

Hull, et al., "CarTel—A Distributed Mobile Sensor Computing System", In Proceedings of the 4th international conference on Embedded networked sensor systems, Nov. 1, 2006, 14 Pages.
Isola, et al., "Image-to-image translation with conditional adversarial networks", In Journal of Computing Research Repository, Nov. 2016, 17 Pages.
Jaderberg, et al., "Spatial transformer networks", In Proceedings of Advances in Neural Information Processing Systems, Dec. 7, 2015, pp. 1-15.
Kazemi, et al., "One millisecond face alignment with an ensemble of regression trees", In Proceedings of the IEEE Conference on Computer Vision and Pattern Recognition, Jun. 23, 2014, 8 Pages.
Le, et al., "Interactive facial feature localization", In Proceedings of the 12th European conference on Computer Vision, Oct. 7, 2012, 14 Pages.
Lecun, et al., "Gradient-based learning applied to document recognition", In Proceedings of IEEE, vol. 86, Issue 11, Nov. 1998, pp. 1-46.
Lee, et al., "A Smartphone-Based Driver Safety Monitoring System Using Data Fusion", In Journal of Sensors, vol. 12, Issue 12, Dec. 17, 2012, pp. 17536-17552.
Lu, et al., "How much time do drivers need to obtain situation awareness? A laboratory-based study of automated driving", In Journal of Applied Ergonomics, vol. 60, Apr. 2017, pp. 293-304.
Marshall, Scott, "How often should you check your mirror,", Retrieved from: https://www.thesafedriver.ca/2009/10/08/how-often-should-you-check-your-mirror/, Oct. 8, 2009, 9 Pages.
Mohan, et al., "Nericell: Rich Monitoring of Road and Traffic Conditions using Mobile Smartphones", In Proceedings of the 6th ACM conference on Embedded network sensor systems, Nov. 5, 2008, 14 Pages.
Murphy, Samantha., "Nissan's drowsiness-detection alert wakes you up if you fall asleep at the wheel", Retrieved from: http://mashable.com/2015/04/02/nissan-drowsy-alert/#Yf9Z9SHQfPqX, Apr. 3, 2015, 15 Pages.
Philip, et al., "Fatigue, sleep restriction and driving performance", In Journal of Accident Analysis & Prevention, vol. 37, Issue 3, May 2005, pp. 473-478.
Qing, et al., "A PERCLOS-based driver fatigue recognition application for smart vehicle space", In Proceedings of Third International Symposium on Information Processing, Oct. 15, 2010, pp. 437-441.
Qiu, et al., "Towards Robust Vehicular Context Sensing", In Journal of IEEE Transactions on Vehicular Technology, vol. 67, Issue 3, Mar. 2018, pp. 1-14.
Sagonas, et al., "300 faces in-the-wild challenge: The First facial landmark localization challenge", In Proceedings of IEEE International Conference on Computer Vision Workshops, Dec. 2, 2013, pp. 397-403.
Sahayadhas, et al., "Detecting driver drowsiness based on sensors: A review", In Journal of Sensors, vol. 12, Issue 12, Dec. 7, 2012, pp. 16937-16953.
Shen, et al., "Effective Driver Fatigue Monitoring through Pupil Detection and Yawing Analysis in Low Light Level Environments", In International Journal of Digital Content Technology and its Applications, vol. 6, Issue 17, Sep. 2012, 10 Pages.
Singh, et al., "Infrared and visible image fusion for face recognition", In Proceedings of Biometric Technology for Human Identification, vol. 5404, Aug. 25, 2004, 12 Pages.
Soukupova, et al., "Real-time eye blink detection using facial landmarks", In Proceedings of 21st Computer Vision Winter Workshop, Feb. 3, 2016, 8 Pages.
Viola, et al., "Rapid object detection using a boosted cascade of simple features", In Proceedings of the IEEE Computer Society Conference on Computer Vision and Pattern Recognition, vol. 1, Dec. 8, 2001, pp. 1-9.
Wahlström, et al., "Smartphone-Based Vehicle Telematics: A Ten-Year Anniversary", In Journal of IEEE Transactions on Intelligent Transportation Systems, vol. 18, No. 10, Oct. 2017, pp. 2802-2825.
Wierwille, et al., "Research on vehicle-based driver status/performance monitoring, development, validation, and of algorithms for detection of driver drowsiness", In Technical report, Dec. 1, 1994, 247 Pages.
Wood, et al., "Learning an appearance-based gaze estimator from one million synthesised images", In Proceedings of the Ninth Biennial ACM Symposium on Eye Tracking Research & Applications, Mar. 14, 2016, pp. 131-138.
Wu, et al., "Constrained joint cascade regression framework for simultaneous facial action unit recognition and facial landmark detection", In Proceedings of the IEEE Conference on Computer Vision and Pattern Recognition, Jun. 27, 2016, 9 Pages.
Yan, et al., "Research on image fusion for visible and infrared images", In Proceedings of IEEE 10th International Conference on Electronic Measurement Instruments, Aug. 2011, pp. 77-79.
Yang, et al., "Detecting Driver Phone Use Leveraging Car Speakers", In Proceedings of the 17th annual international conference on Mobile computing and networking, Sep. 19, 2011, 12 pages.
You, et al., "CarSafe App—Alerting Drowsy and Distracted Drivers using Dual Cameras on Smartphones", In Proceeding of the 11th annual international conference on Mobile systems, applications, and services, Jun. 25, 2013, 14 Pages.
Zafeiriou, et al., "The menpo facial landmark localisation challenge—A step towards the solution", In Proceedings of IEEE Conference on Computer Vision and Pattern Recognition Workshops, Jul. 21, 2017, pp. 170-179.
Zhang, et al., "A new real-time eye tracking based on nonlinear unscented kalman filter for monitoring driver fatigue", In Journal of Control Theory and Applications, vol. 8, Issue 2, May 2010, pp. 181-188.
Zhang, et al., "Appearance-Based Gaze Estimation in the Wild", In Proceedings of IEEE Conference on Computer Vision and Pattern Recognition, Jun. 7, 2015, 10 Pages.
Vural, et al., "Drowsy Driver Detection through Facial Movement Analysis", In Proceedings of International Workshop on Human-Computer Interaction, Oct. 20, 2007, 13 Pages.
"Leave-One-Out", Retrieved from: https://web.archive.org/web/20170517125011/http://homepage.cs.uri.edu/faculty/hamel/courses/2016/spring2016/csc581/lecture-notes/18-model-evaluation.pdf, May 17, 2017, 8 Pages.

\* cited by examiner

SYSTEMS AND METHODS FOR MONITORING DRIVER STATE

CLAIM OF PRIORITY

This application claims the benefit of priority to U.S. Provisional Application Ser. No. 62/641,855, filed on Mar. 12, 2018, which is incorporated herein by reference in its entirety.

TECHNICAL FIELD

Embodiments described herein generally relate to capturing images and the technology related to image processing with artificial intelligence, including for the purposes of facial detection and facial movements.

BACKGROUND

Road safety is a major public health issue the world over, with road accidents causing an estimated 1.25 million fatalities and many more injuries each year, placing it in the top-ten causes of death. Many studies have found that the primary factors responsible for road accidents center on the driver. The state of the driver and their actions are key factors impacting road safety. While some driver assistance systems may exist, these technologies are typically expensive features for a vehicle. Thus, there is a large installed base of vehicles that lack such assistance capabilities. This is especially so in the developing regions, where advanced features in vehicles are often unaffordable but road safety is an acute issue.

Advanced Driver Assistance Systems (ADAS) have been developed for many automobiles to encompass a broad spectrum of driver assistance features, including driver drowsiness detection, blind spot monitoring, lane departure warning, and distracted driving. These features may include the deployment of additional, often specialized, sensors, including cameras looking at the driver's face (for drowsiness monitoring) or out to the front of the vehicle (for lane departure warning), external cameras or radar (for blind spot monitoring), and sensors to detect drowsiness based on the lack of movement of the steering wheel or the loosening of the driver's grip. However, the availability of ADAS is not universal, in both developing regions and the developed world, and is generally confined to high-end vehicles.

Research has suggested improvements to driver monitoring systems such that multiple sensors and cameras may not be necessary. However, these approaches still face technological challenges such as monitoring a driver in lowlight conditions and being universally adaptable to different drivers and vehicles.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
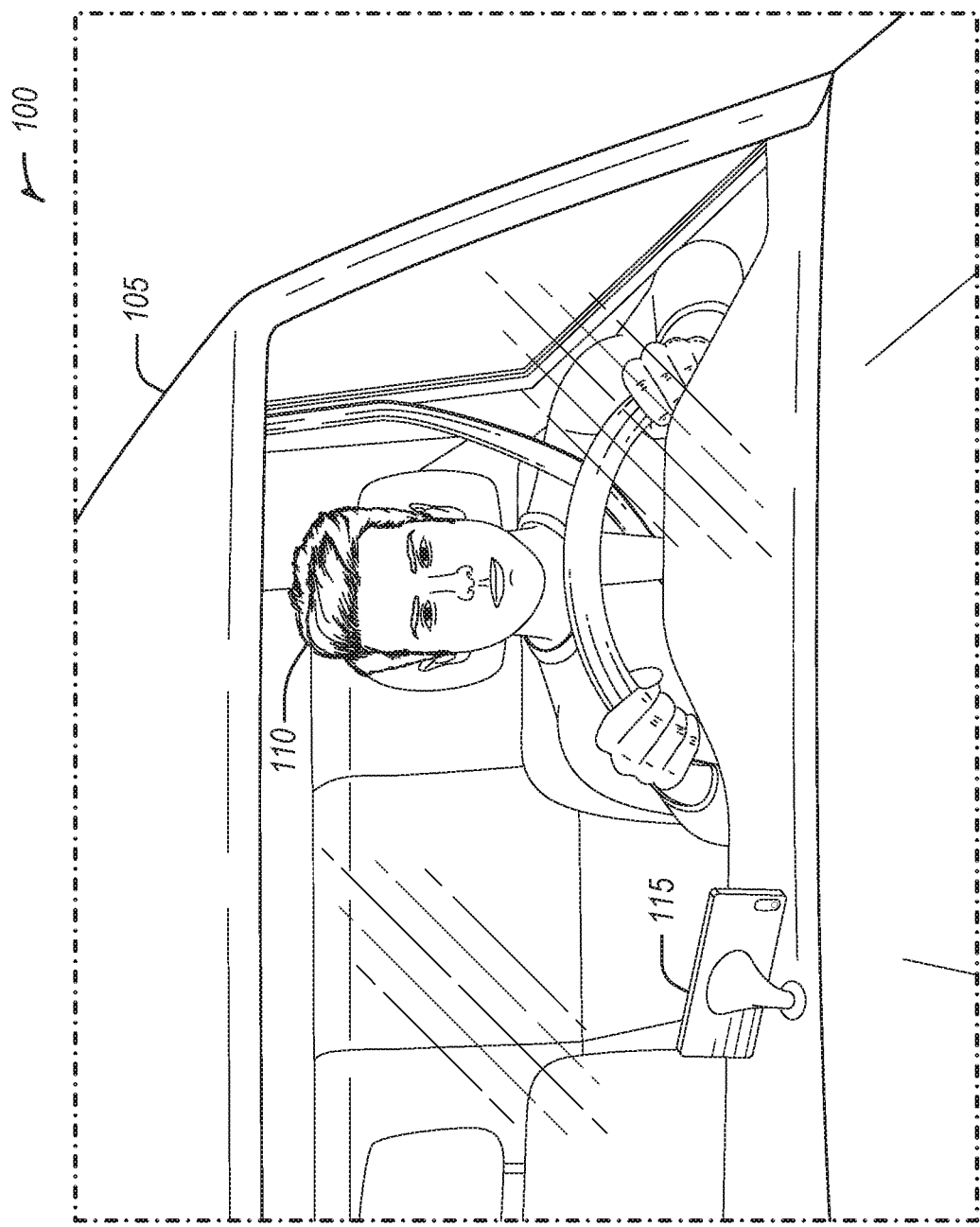
FIG. 1 illustrates an example of the driver state monitor implemented in a smartphone in an automobile environment, according to some embodiments.

Driver and vehicle monitoring systems may be a valuable tool in preventing vehicle related accidents based on driver errors. Additionally, driving services, such as on-demand transportation services and food delivery, are in high demand. These services may want to install driver monitoring devices and mechanisms to help ensure quality performance by their drivers and prevent liability from bad drivers. While some driver monitoring systems, such as ADAS, may provide complex functionality, the complexity of the system may be overly burdensome for most vehicles or overly expensive. At the same time, simpler systems may not provide the functionality needed to be viable solutions. Thus, demand exists for a relatively simple technological solution (e.g.: single camera, no sensors, portable and self-contained system) which overcomes monitoring challenges such as capturing drivers in lowlight environments and is compatible for multiple drivers and vehicles.

Many services, such as on-demand transportation services, food delivery services, and product delivery services, require the driver use their own vehicle when performing the service. It would not be practical for the service to install a complex driver monitoring system in each vehicle to monitor the driver. However, it may be practical for the service to provide a device, such as a smartphone, and a device mount to each driver to place in their vehicle. Additionally, the practicality of such a solution may depend on the adaptability of the monitoring system. There could be variations across vehicles (e.g., the vehicle layout/geometry), smartphone orientation (which could vary each time the smartphone is mounted), and driver seating position. As a result, a suitable monitoring system may have auto-calibration capabilities for both the driver and the environment (e.g.: the camera positioning and vehicle interior).

As discussed herein, the present techniques and configurations provide improvements and solutions to the challenges facing current driver monitoring systems. The present techniques and configurations attempt to remedy the problem of having driver assistance or distracted driver detection systems being limited to constrained and non-universal systems. The present disclosure provides a different approach to solving the problems of a less complex and adaptable driver monitoring technology by employing artificial intelligence for image processing and facial feature detection. This may provide for solutions which may use less specialized hardware technologies with the same capabilities performed by the artificial intelligence image processing.

The present techniques and configurations may be utilized with devices and systems such as smartphones, dash cameras, in-vehicle information or entertainment systems, and similar computing systems with a connected camera. The present techniques and configurations may capture a driver state in multiple lighting environments with a non-specialized RGB camera, and may not require input from any other sources, such as sensors attached to the vehicle.

The present disclosure may use a camera to capture a vehicle driver's face to detect gaze and fatigue. Where a driver is looking is key to safety. Mirror scanning, blind spot monitoring, texting, and rubbernecking are all activities that fundamentally pertain to the driver's gaze. The present disclosure attempts to determine the driver's gaze, by combining head pose and eye tracking, as well as perform auto-calibration to ensure robustness based on variation in camera position and orientation, driver seating, and vehicle configuration. Drowsiness is a major risk factor for drivers. Considerations such as frequent yawning and eye closure may be signs of drowsiness.

Distracted driving, especially symptoms related to drowsiness or fatigue, may be more likely to occur at night. Thus, a desired feature of distracted driving detection system may be a system which can detect signs of drowsiness or fatigue in lowlight or night time conditions. Lowlight conditions may include lighting conditions with a less illumination, such as at night, resulting in the driver's face not being clearly visible. To detect a distracted driver in lowlight conditions may require a specialty type of camera, such as a Forward-Looking Infrared (FLIR) camera to capture thermal images. The present disclosure attempts to provide a solution for capturing images of a driver in lowlight conditions with an RGB camera, such as a camera found on a smartphone or dashcam. The present disclosure leverages features obtained from an RGB image to "cross-train" a model that can detect faces and landmarks in the corresponding thermal image, even in low-light conditions.

Normal lighting conditions may include environments with a high ambient light level where illumination may be present from many directions. Lowlight or nighttime lighting may include environments where there is no ambient light. Light may come from a singular direction and be intermittent. For example, when operating a vehicle at night, there may be no or very little ambient light in the interior of the car. The light in the vehicle may be limited to intermittent light, such as light from oncoming headlights or passing under a street light.

The present disclosure describes a system for detecting a face and facial landmarks, produced from training a thermal face detector with aligned RGB and thermal images taken in daylight conditions. The system may then generate a synthesized thermal image from a lowlight RGB image. The synthesized thermal image may be generated by a Generative Adversarial Network (GAN), where the GAN is trained using aligned lowlight RGB images and thermal images. The facial detection may then be performed by the thermal face detector on the synthesized thermal images, thus providing a solution for detection of a driver's face and facial movements when capturing the driver with only a RGB camera in lowlight conditions.

FIG. 1 illustrates an example 100 of a driver state monitor implemented in a smartphone, according to some embodiments. The driver state monitor may be used to monitor and track the behaviors of a driver 110 while operating a vehicle 105. A camera may be positioned in the vehicle to capture the facial movements of the driver 110 for the driver state monitor. The camera may be part of or connected to a computing device, which may have network connectivity capabilities. For example, the driver state monitor may utilize a camera in a smartphone 115. The driver may position the smartphone 115, such that a camera on the smartphone may capture the face of the driver 110.

Figure 2A:
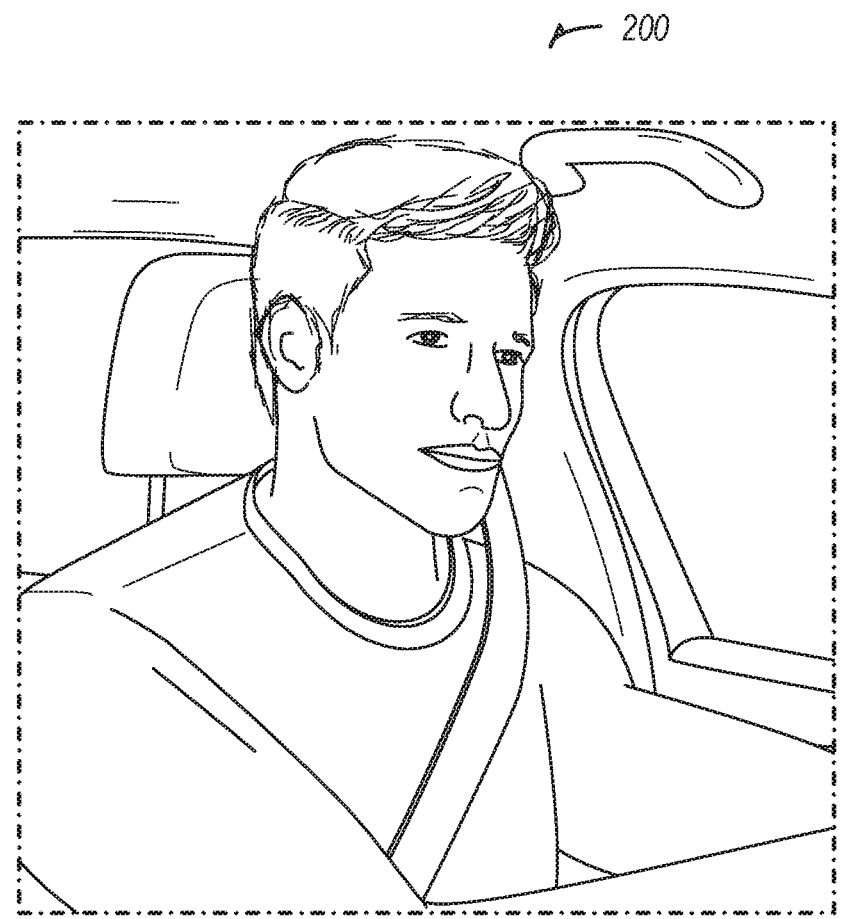
FIGS. 2A-2C illustrate examples of images captured of a driver, according to some embodiments.
Figure 2B:
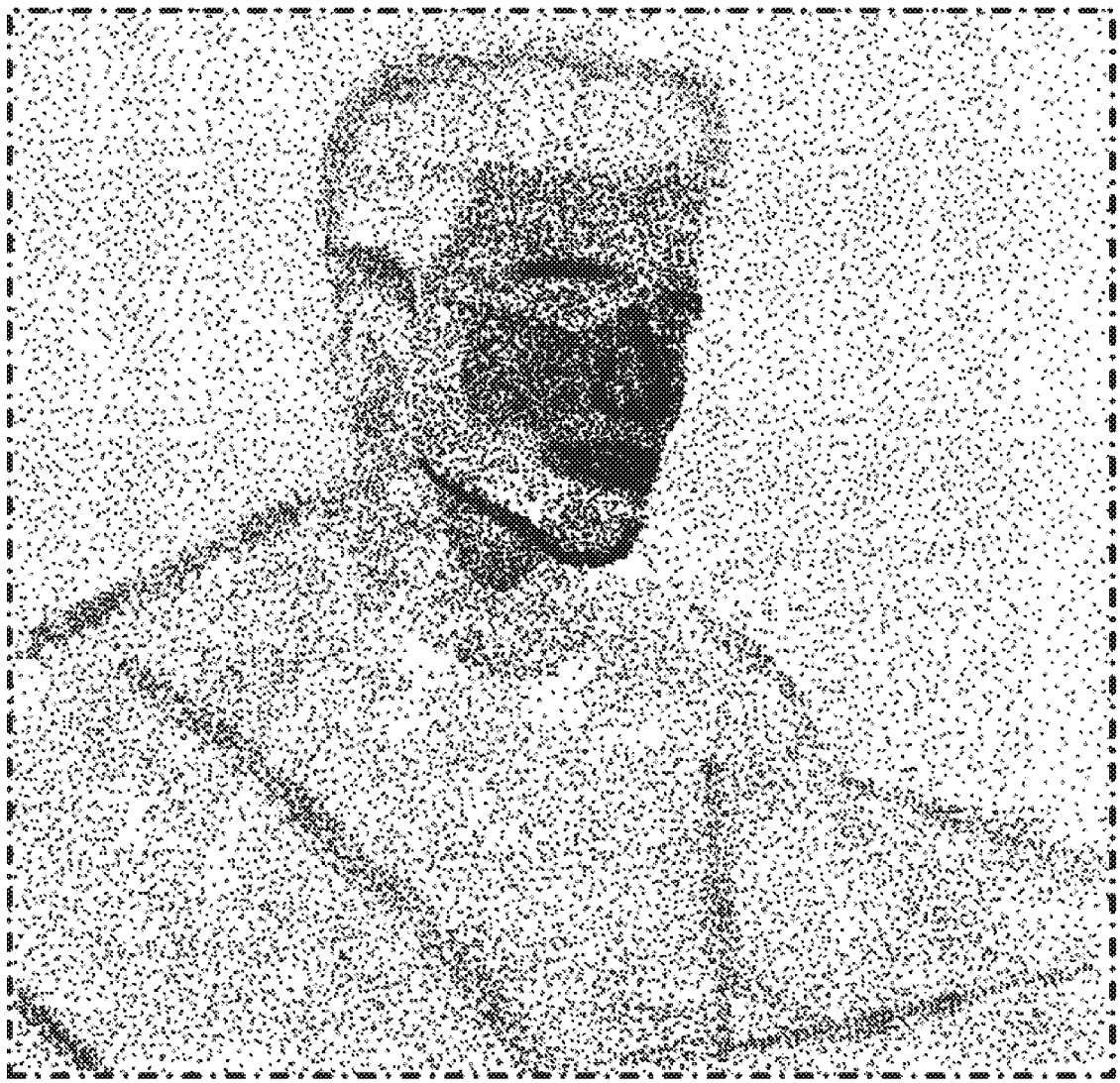
Figure 2C:
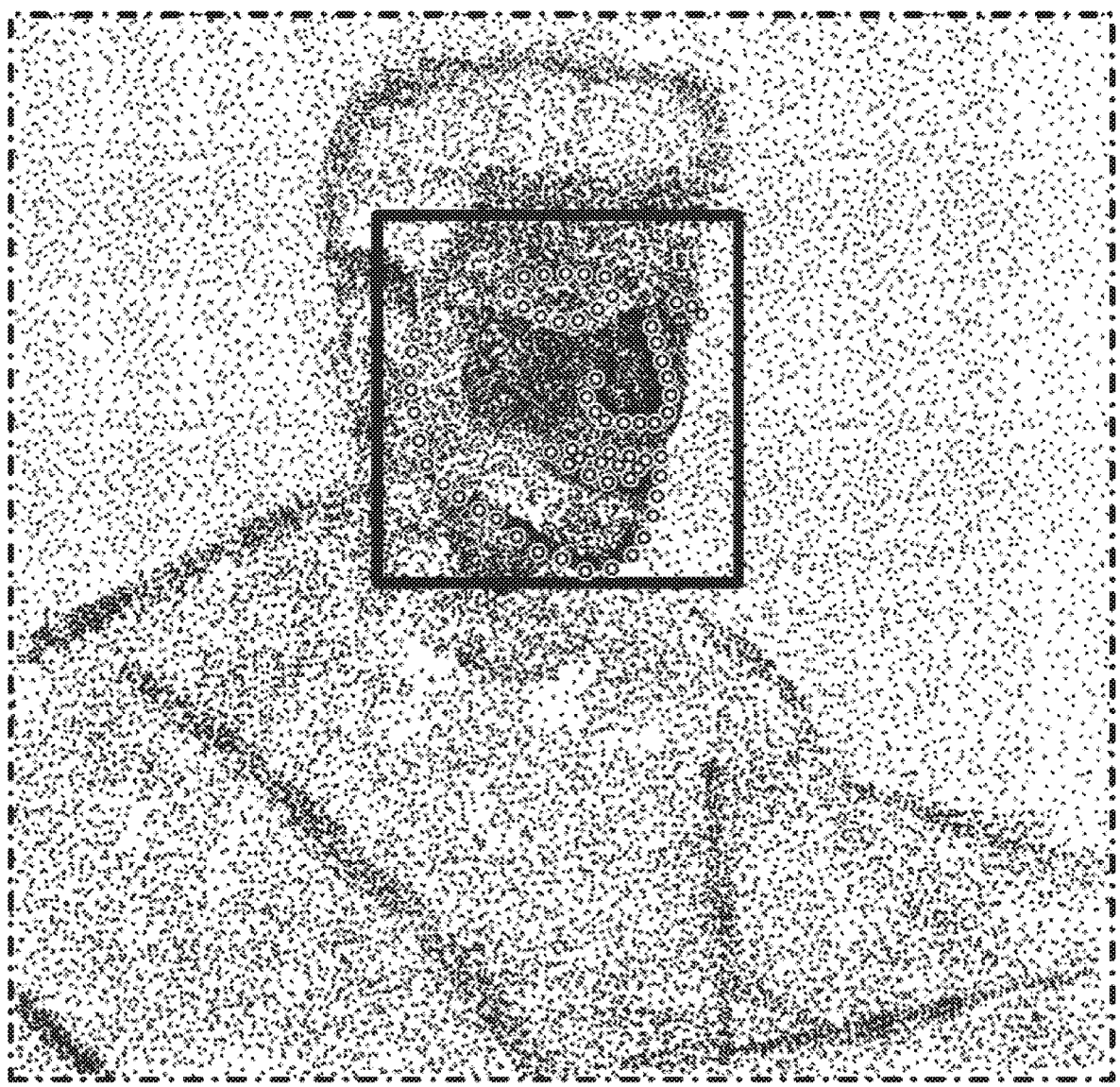

FIGS. 2A-2C illustrate examples of images captured of a driver, according to some embodiments. Driver image 200 may be an example of an image captured of a driver while driving where the driver is visible, such as with an RGB camera with daytime lighting. Thermal image 205 may be an example of a thermal image of a driver. Thermal image 205 may be an example of an image captured by a FLIR camera. The FLIR camera and the RGB camera may capture images in tandem, resulting in images such as driver image 200 and thermal image 205. The driver state monitor may synthesize, such as with a trained GAN, a thermal image, such as thermal image 205, from an RGB image, such as driver image 200. The driver state monitor may then perform face detection and facial landmark detection on thermal image 205. The result may be identified thermal image 210. Identified thermal image 210 may have a bounding box to identify the location of a face in a thermal image, such as thermal image 205. A bounding box may be a rectangular outline overlaid or drawn onto thermal image 205. Identified thermal image 210 may have multiple facial landmark identifiers to indicate the location of facial features such as the eyes, nose, mouth, and chin.

Figure 3:
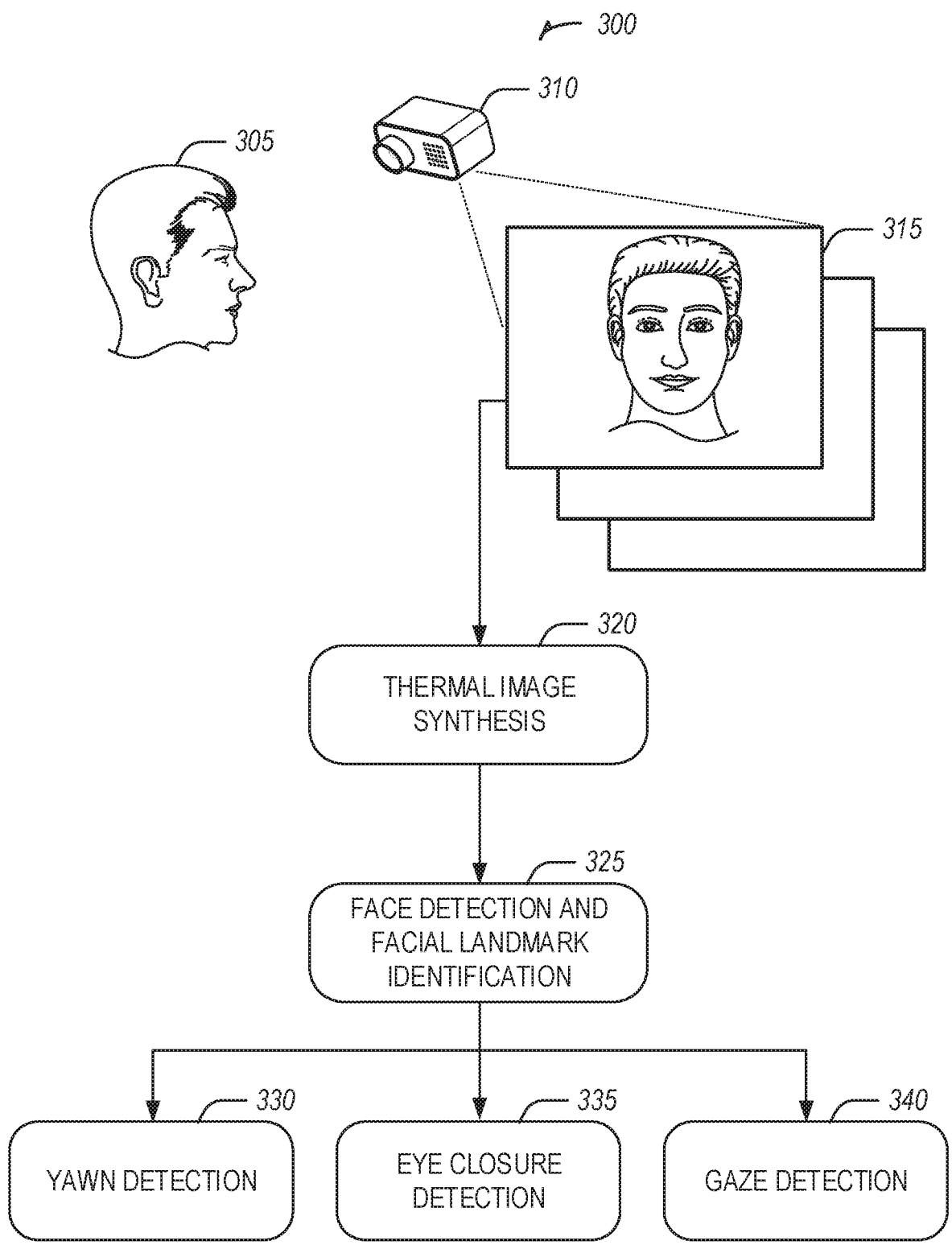
FIG. 3 illustrates an exemplary monitoring process, according to some embodiments.

FIG. 3 illustrates an exemplary monitoring process 300, according to some embodiments. The driver state monitoring process 300 may begin by capturing a series of images 315 of a driver 305, while driving a vehicle, with a RGB camera 310. The RGB camera 310 may be, for example, a camera on a smartphone, a dashboard camera, or a camera as part of a device specific for driver monitoring. The series of images 315 are used as input for thermal image synthesis 320. The thermal image synthesis 320 generates a series of synthesized thermal images corresponding to the series of images 315. Face detection and facial landmark identification 325 is performed on each of the synthesized thermal images. The identified facial landmarks may allow for the present disclosure to analyze the movement of the driver's 305 face and head. This analysis may provide for the present disclosure to perform yawn detection 330, eye closure detection 335, and gaze detection 340. Gaze detection 340 may be used to determine good driver behaviors, such as staying focused on the road and performing routine checks of the vehicle's mirrors. Gaze detection 340 may be used to determine bad driver behaviors such as looking away from the road frequently, texting or looking at a mobile device, or talking to other passengers in the vehicle.

A facial detection system may be used to determine the location of a face in images to then analyze the facial movements for distracted driving. RGB and FLIR thermal images may be captured in tandem in daylight conditions across multiple drivers during actual drives. A Histogram of Oriented Gradients (HOG) detector with Support Vector Machine (SVM) classifier may be implemented for face detection. The pre-trained HOG-SVM face detector may be used to detect faces and determine bounding box for the face in the daylight RGB images. This bounding box may be transferred on to the corresponding FLIR thermal image at the same pixel positions, as both the RGB and the thermal images are aligned. The FLIR thermal images, with face detections bounding boxes transferred from RGB images, serve as training data.

The HOG-SVM thermal face detector may then be trained to detect faces in thermal images using the training data of the thermal images with the transferred bounding boxes. The trained HOG-SVM thermal face detector may be used to detect faces on test thermal images obtained in low-light conditions.

Using the identified location of a face in the images, facial landmarks may be determined for monitoring facial movements. A thermal facial landmark predictor may be trained in a similar fashion to the thermal face detector. In an example, a pre-trained Constrained Local Neural Fields (CLNF) facial landmark model for RGB images may be used to derive facial landmarks, such as 68-point facial landmarks, with daytime RGB images across multiple drivers during actual drives or operation of a vehicle. A CLNF facial landmark model may be chosen because the models may be relatively computationally inexpensive and may be relatively more robust against adverse lighting conditions. The derived landmarks may be transferred to the FLIR thermal images, which may be the training set. For a landmark predictor, each regression function in the cascade efficiently estimates the shape from an initial estimate. The resultant cascade of regressors may localize the facial landmarks in an image.

Figure 4:
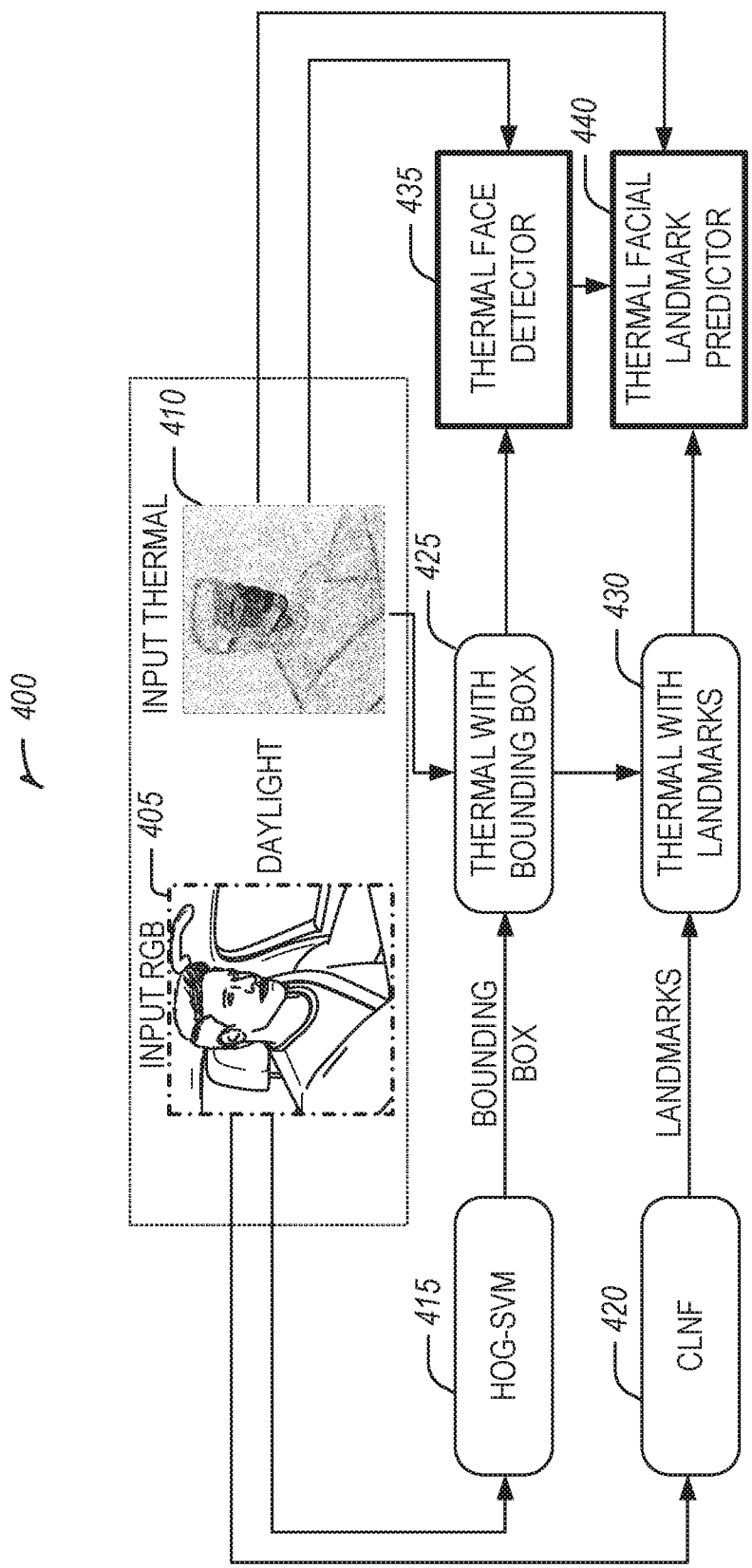
FIG. 4 illustrates an example of the training phase for face detection and facial landmark location predicting, according to some embodiments.

FIG. 4 illustrates an example of the training phase 400 for face detection and facial landmark location predicting, according to some embodiments. The training may begin with a set of input images, where the set of input images includes aligned images captured of a person, such as the operator of a vehicle, with daylight or similar high visibility lighting, the aligned images including one images captured with and RGB camera and a second image captured with a thermal camera, such as a FLIR camera. The RGB camera and the thermal camera may be positioned to capture relatively the same image of the person. For example, the training phase 400 uses two images as input which were captured in daylight conditions, input RGB image 405 and input thermal image 410. As illustrated in FIG. 4, input RGB image 405 and input thermal image 410 each capture relatively the same image of the driver, but with each image produced with the respective capture technique (specifically, RGB, FLIR thermal).

The input RGB image 405 may be used as input to a pretrained face detector for non-enhanced images (e.g.: RGB color, black and white), such as the pretrained HOG-SVM face detector 415. The pretrained HOG-SVM face detector 415 locates the face in the input RGB image 405, such as by placing a bounding box on the image which bounds the determined region of the face in the input RGB image 405. The training phase 400 takes the location of the bounding box from the pretrained HOG-SVM face detector 415 and combines it with the input thermal image 410 to generate a thermal image with a bounding box 425. The thermal image with a bounding box 425 and the input thermal image 415 may be used as input to train a new thermal image face detector 435. A HOG-SVM face detector may be trained as the thermal image face detector 435.

Training the thermal image facial landmark predictor 440 involves a process similar to the thermal image face detector 435. A pretrained facial landmark predictor, such as a facial landmark predictor using a CLNF model 420 may receive the input RGB image 405 as input. The CLNF model 420 identifies the location of facial landmarks on the input RGB image 405. The training phase 400 takes the location of the facial landmarks from the pretrained CLNF model 420 facial landmark predictor and combines landmarks with the thermal image with a bounding box 425 to generate a thermal image with facial landmarks 430. The thermal image with facial landmarks 430 and the input thermal image 415 may be used as input to train a new thermal image facial landmark predictor 435. A CLNF model facial landmark predictor may be trained as the thermal image facial landmark predictor 440.

Figure 5:
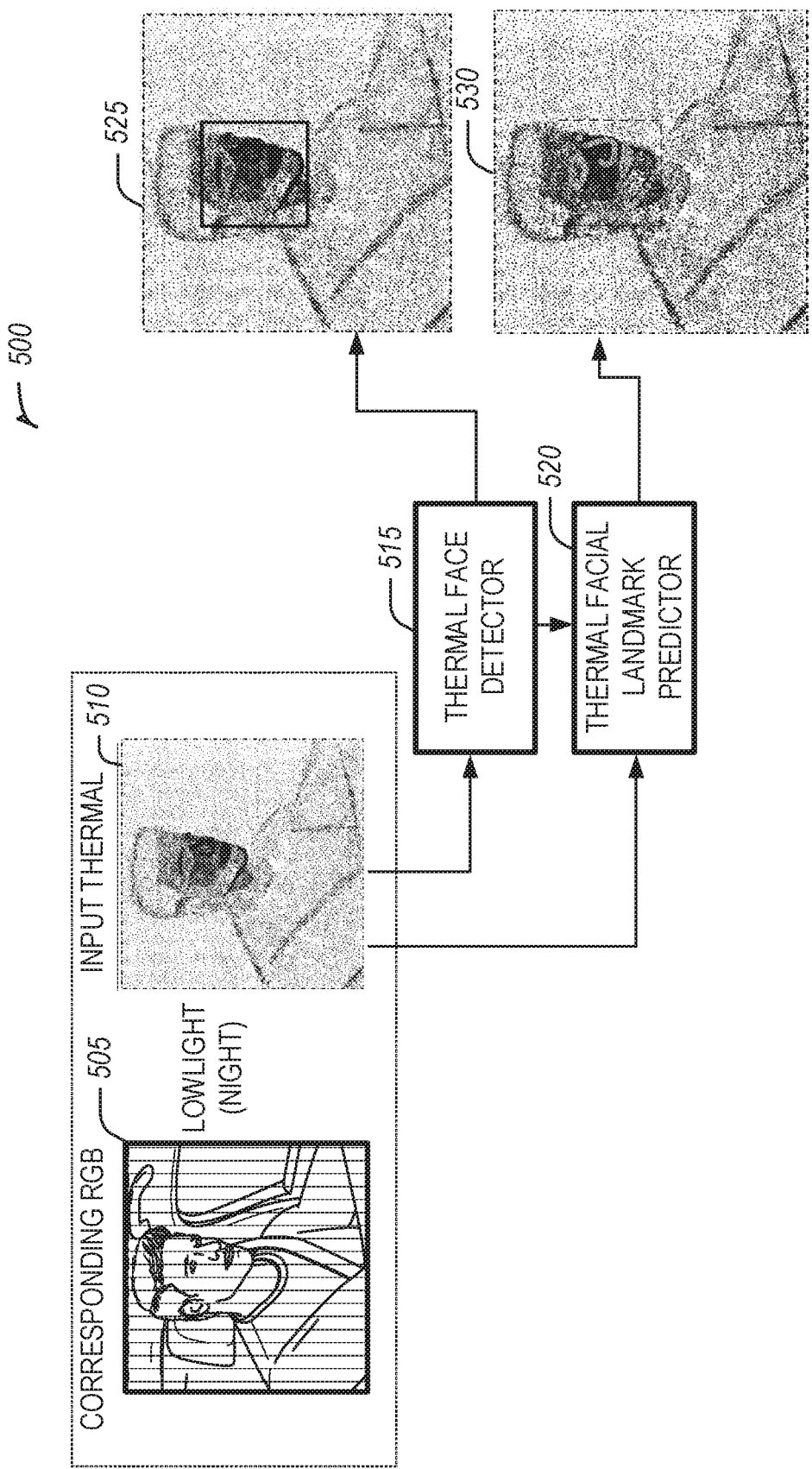
FIG. 5 illustrates an example of the verification process for the thermal image face detector and the thermal image facial landmark predictor, according to some embodiments.

FIG. 5 illustrates an example of the verification process 500 for the thermal image face detector 515 and the thermal image facial landmark predictor 520, according to some embodiments. As illustrated in FIG. 4, the thermal image face detector 515 and thermal image facial landmark predictor 520 may have been trained with thermal images captured with daylight lighting conditions. Thus, a verification process 500 may be performed with the thermal image face detector 515 and thermal image facial landmark predictor 520 as proof of technique to confirm their performance with thermal images captured in lowlight or night time lighting conditions.

To verify the performance of the thermal image face detector 515 and thermal image facial landmark predictor 520, an input thermal image 510 captured with lowlight conditions may be used as input. The corresponding lowlight RGB image 505 is illustrated for exemplary purposes for an RGB image and a thermal image captured in tandem with lowlight conditions. The input thermal image 510 may be input for verifying the thermal image face detector 515. The thermal image face detector 515 may be verified as performing correctly for lowlight thermal images should it identify the location of a face in the input thermal image 510, as illustrated by result image 525. The input thermal image 510 and the result image 525 may be input for verifying the thermal image facial landmark predictor 520. The thermal image facial landmark predictor 520 may be verified as performing correctly for lowlight thermal images should it identify the location of facial landmarks in the input thermal image 510, as illustrated by result image 530.

The facial detection system and the thermal facial landmark predictor both use thermal images as input. As previously noted, having a FLIR camera may only be possible in high-end vehicles. Thus, the present disclosure uses an RGB camera to capture RGB images of the driver and synthesize thermal images from the RGB images as input for the facial detection system and the thermal facial landmark predictor. This may allow for the facial detection system and thermal facial landmark predictor to be used with lowlight RGB images without the need for a FLIR camera or additional sensors.

The present examples may generate synthesized thermal images using a GAN. A GAN uses an adversarial loss function to classify if the output image generated is real or synthetic. A GAN comprises two adversarial models, a generator network and a discriminator network. The generator network may apply a transformation to the input image to generate an output image. The discriminator network outputs a single scalar value representing the probability that the output image came from the (real) training data rather than the (synthetic) generated data. For example, the generator network may be an "encoder-decoder" network that takes a 256×256 image with 3 color channels as input (such as a lowlight RGB image). The encoder may compress the input to a compact representation with a series of steps, to obtain a high-level representation of the input image. The decoder does the reverse and generates an output image (such as a synthesized thermal image) using the compact representation of the input. The discriminator network may be an encoder network that takes two inputs, an input RGB image and the generator network output thermal image, and compresses to a 30×30 matrix. Each value in the 30×30 matrix is either a 0 or 1, according to whether the discriminator network believes the corresponding part of the generator image matches to the input image or not.

The generator network and discriminator network may be trained using the input-target pairs, for example, aligned RGB and FLIR thermal images. First, the generator network generates an output image, the synthetic thermal image, for a given input, the real RGB image. The discriminator network, which may be trained with pairs of input images and the corresponding target thermal images, such as thermal images obtained using a FLIR camera, determines the probability that the generated output image is real, or if it corresponds to the input RGB image. The weights of the discriminator network are then adjusted based on the classification error. The weights of the generator network are also adjusted based on the output of discriminator network. The GAN calculates the gradients through the discriminator network, and consequently, the generator network learns the correct mapping function through gradient descent. Thus, as the discriminator network gets better at determining between real and synthetic thermal images, so does the generator network in synthesizing more realistic thermal images. The trained GAN may synthesize a thermal image based on a low light RGB image.

Figure 6:
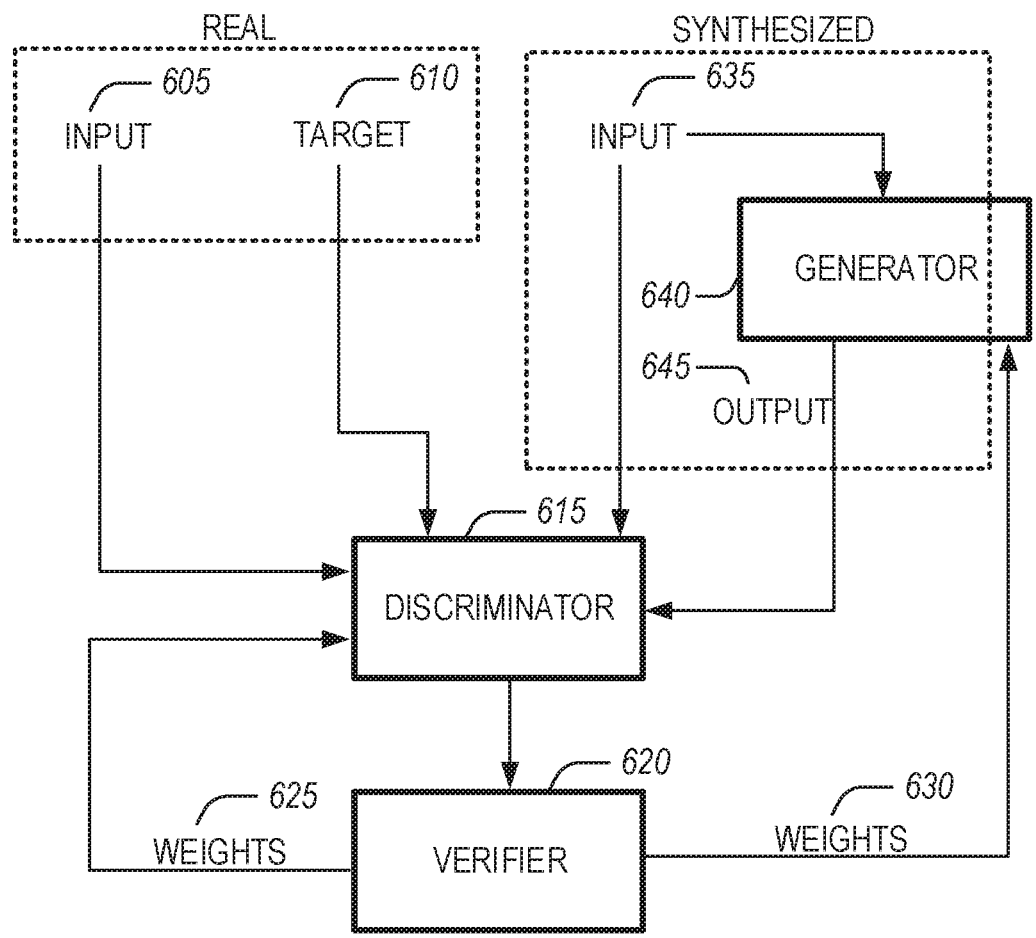
FIG. 6 illustrates an example generative adversarial network for synthesizing a thermal image from an RGB image, according to some embodiments.

FIG. 6 illustrates an example GAN 600 for synthesizing a thermal image from an RGB image, according to some embodiments. The GAN 600 may be trained with input 605, a real RGB image, and a target 610, a real thermal image corresponding to the RGB image. The discriminator 615 receives the input 605 and target 610 in training to determine how the input 605 corresponds to the target 610. Similarly, the generator 640 is trained to generate synthetic thermal images by receiving the input 605 and target 610. After the discriminator 615 and generator 640 are trained, the generator may receive input 635, a real RGB image (without a corresponding thermal image). The generator 640 may generate output 645 of a synthesized thermal image. The input 635 and output 645 may be sent to the discriminator 615. The discriminator 615 may determine if the generated output 645 corresponds to the input 635. A verifier 620 may be used to confirm the classification performed by the discriminator 615. From the verification of the verifier 620, weights 625 may be adjusted for the discriminator 615 based on classification errors. Weights 630 may be adjusted for the generator 640 based on the verified classification of the discriminator 615. Through this iterative process, the discriminator 615 and generator 640 are refined such that the GAN 600 may be used to generate a synthesized thermal image corresponding to an input 635 real RGB image.

Figure 7:
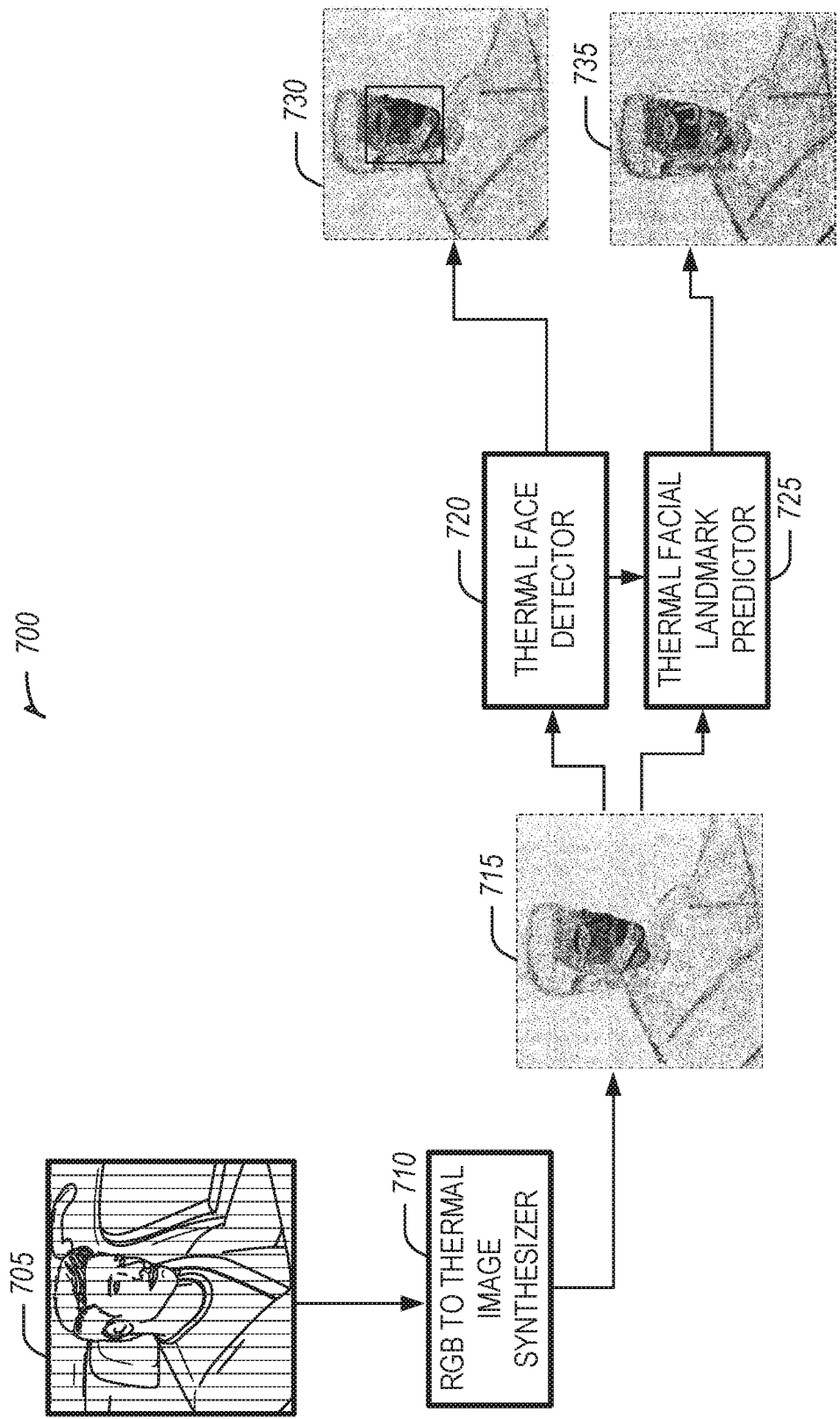
FIG. 7 illustrates the presently disclosed process for detecting a face and facial landmarks from an RGB image, according to some embodiments.

FIG. 7 illustrates a process 700 for detecting a face and facial landmarks from an RGB image, such as a lowlight RGB image 705, according to some embodiments. The present disclosure may receive a set of RGB images to detect a face and facial landmarks, which can may be used to determine facial movements such as eye closure, yawning, and looking at distractions. The facial movements may be used to determine the attentiveness of the driver, such as by tracking the amount of time the driver is looking forward and following good driving techniques such as frequently checking the side mirrors. For each RGB image in the set of RGB images, such as lowlight RGB image 705, the present disclosure uses an RGB to thermal image synthesizer 710 to generate a synthesized thermal image 715. The RGB to thermal image synthesizer 710 uses a GAN to train and synthesize thermal images from RGB images, as described in FIG. 6. The synthesized thermal image 715 may be used as input for the thermal face detector 720 and the thermal facial landmark predictor 725. The thermal face detector 720 may be a HOG-SVM thermal face detector as described in FIG. 4. The thermal face detector 720 uses a bounding box to determine the location of the face in the synthesized thermal image 715. The thermal face detector 720 provides a result, such as the bounding box identified thermal image 730. The result of the thermal face detector 720 may be provided to the thermal facial landmark predictor 725 to narrow the area of the synthesized thermal image 715 that the thermal facial landmark predictor 725 analyzes to locate the facial landmarks. The thermal facial landmark predictor 725 may be a CLNF trained thermal facial landmark predictor as described in FIG. 4. The thermal facial landmark predictor 725 determines multiple landmark points indicative of facial features, such as the eyes and the mouth, on the synthesized thermal image 715. These landmarks may be indicated with a series of dots on the synthesized thermal image 715, resulting in the facial landmark detected thermal image 735. Performing the process 700 on a series of RGB images may result in a series of facial landmark detected thermal images. Analyzing the changes in movement for the facial landmarks from one images to the next may indicate facial feature movements, such as eye closure.

The techniques described herein may be used to determine the driver gaze direction, which may determine if the driver is distracted, such as looking at their phone or not keeping their eyes on the road. Gaze direction may be determined by the head pose alone, but a pure head pose based approach may fail in real-world settings in which a driver often scans the surrounding environment with quick glances and without turning their head significantly. Therefore, to track the driver's gaze, the present disclosure tracks the eyes as well as the head pose of the driver.

The head pose angles may be determined using the facial landmarks. For example, the Perspective-n-Point (PnP) and random sample consensus (RANSAC) algorithms may be used to obtain the head pose, specifically yaw and pitch angles with respect to the camera. To obtain eye gaze information, from each image, an eye-ROI (region of interest) may be extracted. Using the eye-landmarks from the facial landmarks as a reference, a region maybe cropped from each image, bounding the eyes of the subject. Variation in skin tone and illumination conditions may be an issue, thus a histogram-equalization may be applied to the image to adjust the contrast such that both dark and light pixels have an equal contribution.

The direction of gaze of the driver may be estimated using the head-pose and the eye-ROI. For example, direction of gaze of the driver may be estimated by combining the head-pose angles with the eye-ROI image, using an existing LeNet based convolution neural network (CNN) architecture. A batch-normalization layer may be added to the CNN to improve performance and accuracy, and preprocessing step may be used to learn affine transformation to correct misaligned eye-ROI based on errors in facial landmark localization. The CNN may comprise two convolution layers, two maxpooling layers, and a fully connected layer. A rectified linear unit may be applied. Using a batch-normalization layer after both of the convergence layers may improve convergence.

The quality of the data produced by the CNN may be improved with a Spatial Transformer Network (STN) and data augmentation. An error occurring with the facial landmark localization may produce misaligned eye-ROIs. Preprocessing with an STN trained with a gaze estimation network, may correct the errors. To aid the CNN in generalizing, the training data may be augmented using random scaling, shifting, and rotation as global transformations. To assist the CNN with variations in skin tone and illumination, appearance is augmented using random shift in brightness, gamma, and hue values.

Mirror scanning may help a driver maintain situational awareness of their surroundings and may be considered a key to safe driving. Failure to scan mirrors frequently may indicate a lack of situational awareness. The driver and vehicle configuration may determine how much a driver must change their gaze to scan their mirrors. For example, a short driver who sits close to the steering wheel may make significant head turns to see the side mirrors. But a taller driver who sits back may be able to glance at the mirrors while turning their head less. Due to such variation, using fixed, preconfigured thresholds may not provide for accurate detection of mirror scanning. To address this issue, the present disclosure may perform an auto-calibration process to determine when an individual driver is scanning the mirrors.

For the auto-calibration process, the present disclosure analyzes the gaze distribution during the initial part of the drive to build a probabilistic model to determine the dominant directions of the driver's gaze. Although the driver's gaze is not restricted in an uncontrolled setting, there are three frequently occurring states: (1) Left-mirror scan. (2) Right-mirror scan, and (3) Straight gaze (e.g.: driver paying attention on the road straight ahead). A probability distribution may be used to represent the three frequently occurring states. The present disclosure auto-calibrates for each driver by identifying the three frequently occurring states through a probability distribution and once identified may track the frequency the driver looks to the mirrors (e.g.: left-mirror scan and right-mirror scan) throughout the remainder of the drive.

The present disclosure may determine drowsiness of the driver by detecting frequent eye blinks and yawning. The percentage of closure (PERCLOS), which is the proportion of time in a minute the eyes are closed, may be a metric used to determine driver alertness. Robust and real-time eye state detection with an RGB camera, such as on a smartphone, may present challenges due to the diversity of situations (e.g., people wearing glasses), lighting conditions (e.g., shadows), and relatively low camera resolution.

The eye state may be determined by an eye aspect ratio (EAR), which is the ratio of the height and width of the eye. EAR is close to zero when the eyes are closed and non-zero when the eyes are open. The present disclosure may auto-calibrate for each individual driver to determine eye state. EAR varies from person to person depending on how wide a person opens their eyes. In the first few minutes of a drive, the drive state monitor may auto-calibrate, during which the average EAR when the eyes are open is computed. The average EAR may be used to compute a threshold that may be used to classify between the eyes being open and the eyes being shut. The threshold may be adapted in proportion to the size of the face detected bounding box, which may cater to changes such as the driver leaning forward or back. The present disclosure may calculate the PERCLOS in real-time, based on the ratio of number of frames with the eyes closed to the total number of frames in a minute. For example, the driver may be drowsy if the PERCLOS exceeds 30%.

Frequent yawning may be a behavioral trait that is a strong indicator of fatigue or drowsiness. Yawning may be determined in a manner similar to the EAR. The mouth aspect ratio (MAR) is the ratio between the height and width of the mouth. The MAR is close to zero when the mouth is closed and a non-zero value when it is open. MAR varies from person to person depending on how wide a person opens their mouth (e.g., keeping lips pursed; having lips slightly parted when the mouth is shut). In the first few minutes of a drive, the drive state monitor may perform auto-calibration, during which the average MAR when the mouth is closed is computed. A yawn is detected when the mouth is found to be open continuously for a prolonged period. For example, the driver state monitor may continuously compute the MAR and determine a yawn when the MAR crosses a threshold, such as for a time window of one second.

For all the types of driver behavior the present disclosure may be monitoring, including undesirable behaviors such as yawning, eye closure, and looking away from the road, and desirable behaviors such as frequent mirror scanning and checking a blind spot, the present disclosure utilizes an auto-calibration process which includes observing (i.e., capturing and analyzing facial images of) the driver for a period of time when a driver first begins operating a vehicle. The auto-calibration process may be used in place of fixed thresholds. The auto-calibration process allows for the present disclosure to determine a driver's normative facial and head movements. The auto-calibration process allows for changes in the environment, such as different vehicles, lighting changes, and different positioning of the camera, to be compensated for.

A driver may use a peripheral camera and computing device, such as a smartphone, in the vehicle to monitor their driving. A driver may use a preinstalled camera and computing device, such as an infotainment system, in the vehicle to monitor their driving. A driver state monitoring system may be stored and executed within the computing device inside the vehicle. Alternatively, the driver state monitoring system may be located remotely, such as a server, such that the computing device communicates with the server over a network. The computing device may capture the RGB images and transmit the RGB images to the server over the network for the driver state monitor to process the images and determine the driver's state, such as being distracted or suffering from fatigue. The remote driver state monitor may transmit information back to the computing device based on the determination of the driver's state.

The operations of the techniques described herein may determine the driver state is distracted, such as from fatigue, the driver's focus is away from the road, or the driver is not properly scanning mirrors. Based on the driver state, several actions may be taken. An in-vehicle alert may be used to notify the driver they are distracted. For example, when using the driver state monitor on a smartphone, the smartphone may play a loud audible tone and display a message to the driver on the smartphone screen. In another example, if the driver state monitor is connected to computer system linked to the operation of the vehicle, vibrations may be sent to the steering wheel. In extreme circumstances, the vehicle may begin to gradually apply the brakes to slow the vehicle down, such as if the driver state monitor determines the driver is drowsy while travelling on the highway.

The present disclosure may transmit an alert of distracted driving to a remote location, such as a driver monitoring service or dispatch. For example, a trucking company may utilize the driver state monitor in their trucks to monitor how their drivers are performing. The dispatch for the trucking company may receive alerts when it is determined the driver is distracted or fatigued. A dispatch person may use this information to assess the situation in real-time, such as contacting the driver or remotely taking control of the truck to shut down the engine.

Over time, the determinations of distracted driving may be collected and stored, either on an in-vehicle device or transmitted to a remote storage device or center, such as a data warehouse. The data for a particular driver may be analyzed to determine statistics such as the frequency of distracted driving occurrences compared to their overall driving time, which types of distractions they are inclined to, and the time of day when the distracted driving is more likely to occur. These statistics and analysis may be provided plainly to a driver wishing to improve their driving and awareness. The statistics may be compiled into a driver score. The driver score may be used for a driver of a taxi service or on-demand car service such as Uber or Lyft. A passenger requesting the car service may be provided the driver score to allow the passenger to select the driver with a score indicating a lower frequency of distraction. The driver score may be used for hiring drivers, such as with a trucking or delivery service. The service may use the driver score as a qualification for employment.

Figure 8:
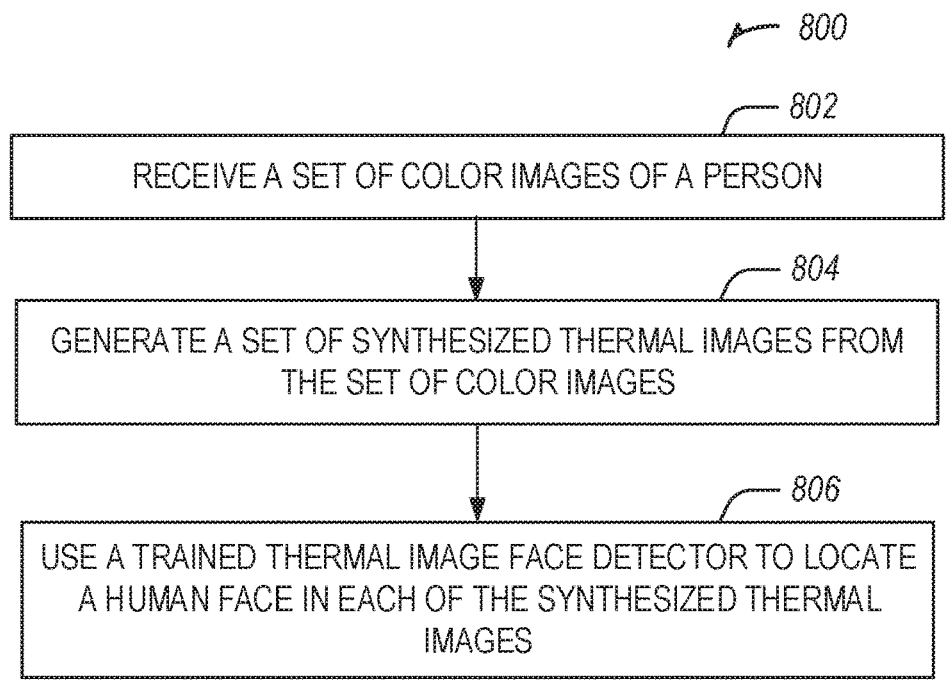
FIG. 8 illustrates a flowchart showing a technique for locating a human face in an image, according to some embodiments.

FIG. 8 illustrates a flowchart showing a technique 800 for locating a human face in an image, according to some embodiments. The technique 800 includes an operation 802 to capture a set of color images of a person. The person may be the operator of a vehicle, such as a car or truck. The vehicle may be any mode of transportation or moving apparatus which has a human driver or operator, such as a boat, a train, a plane, or earth moving equipment. The set of color images may be directed at the head and upper torso area of the person, such as to capture the face of the person. The color images may be captured in an environment with a low level of brightness or light, resulting in a lack of visual features in the set of color images of the person. For example, a car being driven at night may have a relatively dark interior. The set of color images may be captured with a camera, such as a camera that is part of a smartphone. The technique 800 may further include an operation to identify a state of vehicle operation.

The technique 800 may further include an operation 804 to generate a set of synthesized thermal images from the set of color images. The synthesized thermal images may be generated using a generator of a generative adversarial network. The generative adversarial network may be trained using sets of aligned color and thermal images and tested using color images captured in environments with a low amount of ambient light.

The technique 800 may further include an operation 806 to use a trained thermal image face detector to locate a human face in each of the synthesized thermal images. The trained thermal image face detector may be a HOG-SVM face detector trained with thermal images using a transferred face location indicator (e.g.: a bounding box) from a color image with a previously identified face location. The technique 800 may further include an operation to use a trained thermal image facial landmark predictor to locate facial landmarks in each of the synthesized thermal images. The trained thermal image facial landmark predictor may be a CLNF model trained with thermal images using transferred facial landmark locations from a color image that previously had facial landmarks identified. The technique 800 may further include an operation to analyze the facial landmarks from one synthesized thermal images to the next in a sequence to determine facial feature movements. For example, the facial feature movements may indicate eye closure or yawning.

The technique 800 may further include an operation to determine a direction of gaze from the facial landmarks for each of the synthesized thermal images. For example, using a combination of the facial landmarks indicating the location of eyes in the synthesized thermal images to find an eye region of interest and a head pose angle may provide for determining the direction of gaze of the person captured in the images. The technique 800 may further include an operation to cluster the direction of gaze for each of the synthesized thermal images into a distribution. For example, a driver may primarily look forward, and to the left and right, which may be the dominant clusters of the distribution. The distribution may result in directions of gaze not being part of the dominate clusters, such as forward, left, or right. These clusters may indicate the driver is looking away from the road and may be distracted. The technique 800 may further include an operation to determine a state of forward direction of gaze based on the predominate cluster of the distribution. The state of forward direction of gaze may correspond to a centered direction in the visual field of the person, such as when the person, or driver, is looking at the road ahead.

The technique 800 may further include an operation to analyze the distribution of the direction of gaze for the set of synthesized thermal images to determine a state of left direction of gaze corresponding to looking at a left mirror and a state of right direction of gaze corresponding to looking at a right mirror. The technique 800 may further include an operation to determine each instance for the state of left direction of gaze and the state of right direction of gaze for the set of synthesized thermal images and calculate a mirror check frequency score based on a total number mirror check instances over a period of time.

Figure 9:
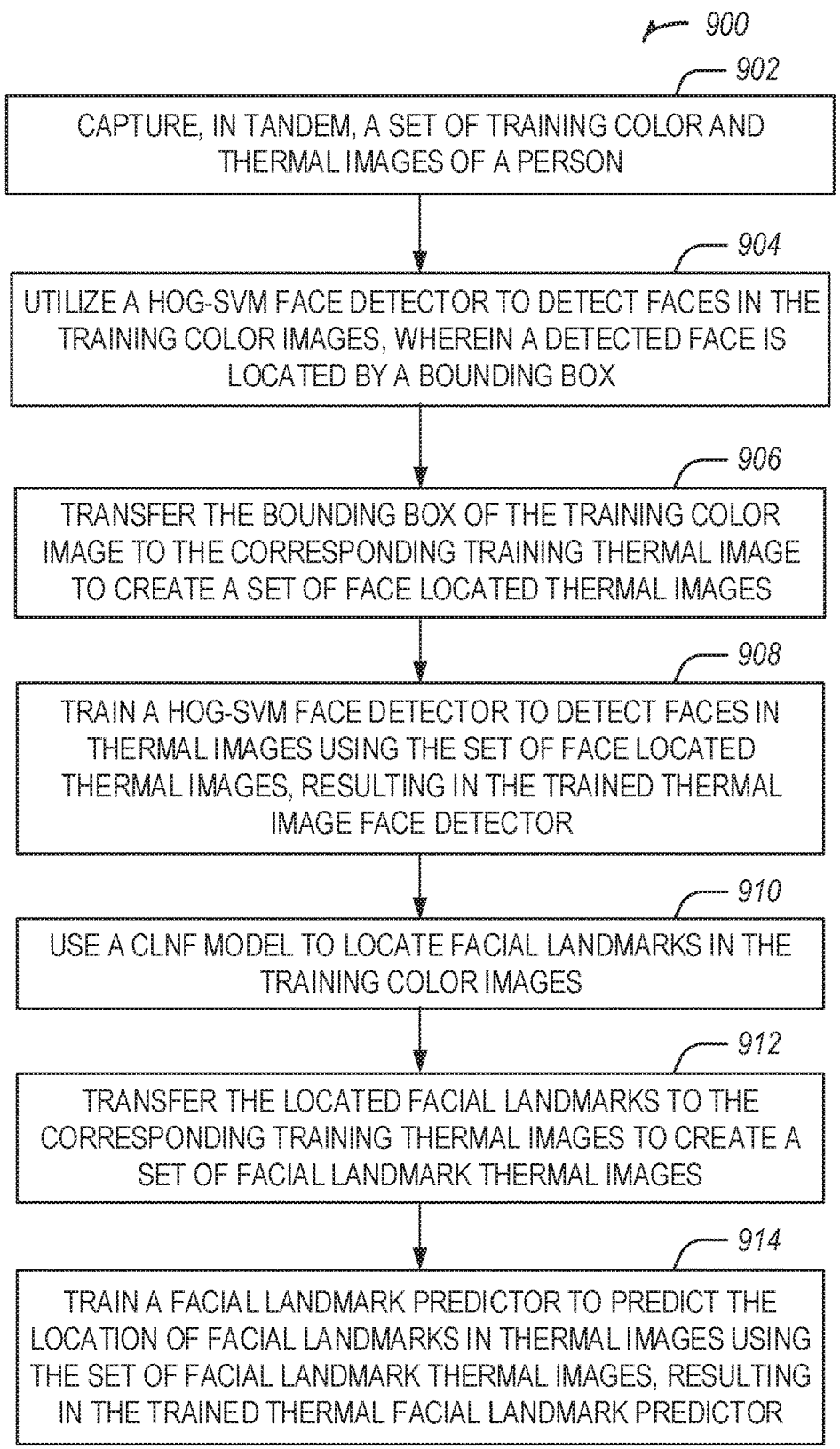
FIG. 9 illustrates a flow chart showing a technique for training a thermal image face detector and a thermal image facial landmark predictor, according to some embodiments.

FIG. 9 illustrates a flow chart showing a technique 900 for training a thermal image face detector and a thermal image facial landmark predictor, according to some embodiments. The technique 900 may include an operation 902 to capture a set of training images, the set comprising color images and thermal images taken in tandem, such that each color and thermal pair capture relatively the same scene. For example, to generate the training data, a RGB camera and a FLIR thermal camera may be positioned next to each other on the dashboard of an automobile, with both directed at the driver. Both cameras may capture images as the driver drives the automobile. The images are captured in tandem, and based on the cameras each being positioned in the same direction, the captured images may be relatively the same scene, with the differences related mostly to the type of camera. The training images may be used for training both the thermal image face detector and a thermal image facial landmark predictor.

The technique 900 may further include an operation 904 to utilize a HOG-SVM face detector to detect faces in the training color images, wherein the location of a detected face is indicated by a bounding box placed on the color image. The technique 900 may further include an operation 906 to transfer the bounding box of the training color image to the corresponding training thermal image to create a set of face located thermal images. The technique 900 may further include an operation 908 to train a HOG-SVM face detector to detect faces in thermal images using the set of face located thermal images, resulting in the trained thermal image face detector.

The technique 900 may further include an operation 910 to use a CLNF model to locate facial landmarks in the training color images. The technique 900 may further include an operation 912 to transfer the located facial landmarks to the corresponding training thermal images to create a set of facial landmark thermal images. The technique 900 may further include an operation 914 to train a facial landmark predictor to predict the location of facial landmarks in thermal images using the set of facial landmark thermal images, resulting in the trained thermal facial landmark predictor.

Figure 10:
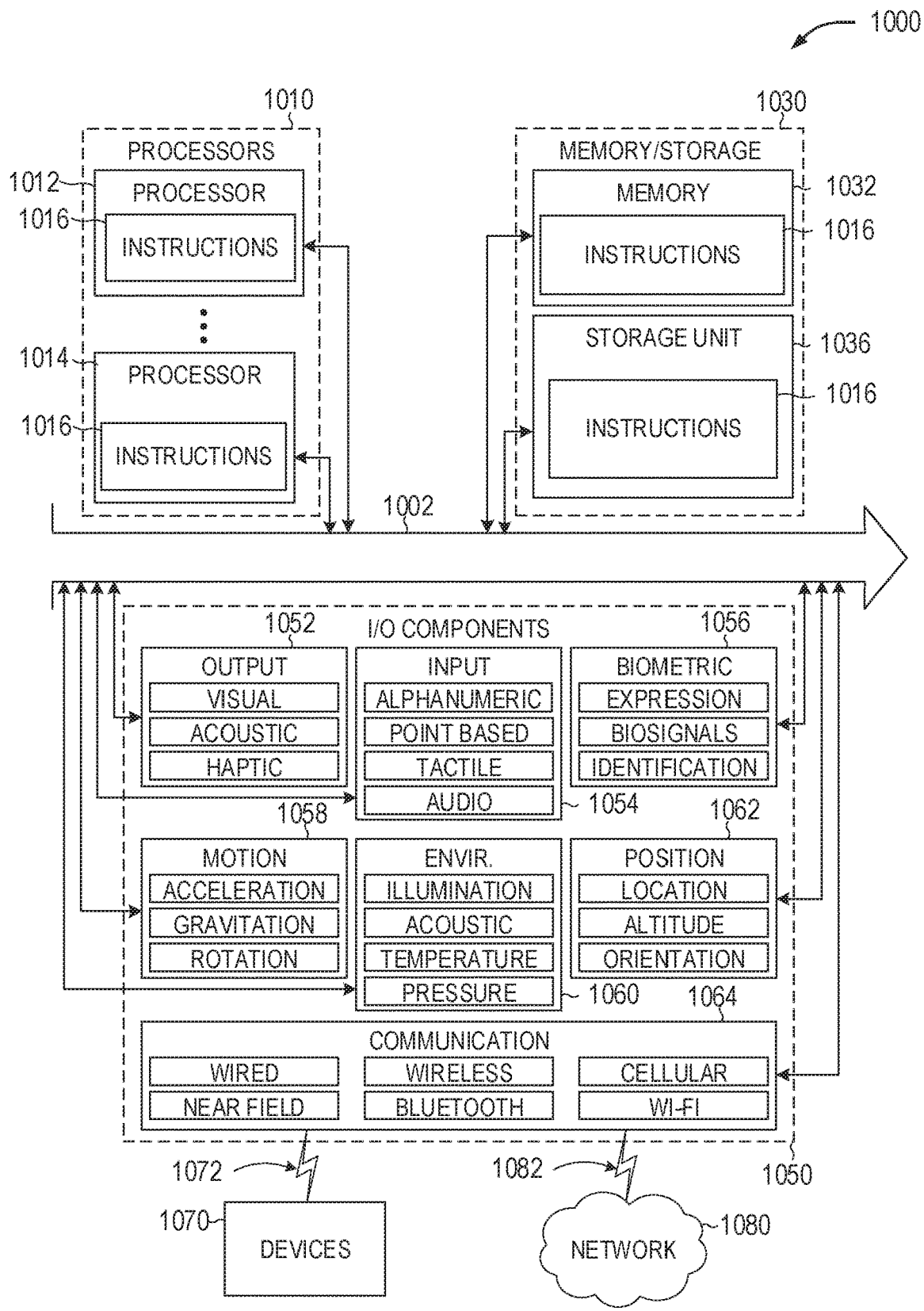
FIG. 10 is a block diagram illustrating an example of a machine upon which one or more embodiments may be implemented.

FIG. 10 is a block diagram illustrating components of a machine 1000 which according to some example embodiments is able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. The instructions 1016 transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions (e.g., instructions 1016) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. For example, in addition to a speaker, the output components 1052 may include a visual output device adapted to provide augmented visual colors, animations, and presentation of information that is determined to best communicate and improve the user's mood to an optimal state as described herein. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure bio-signals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or other suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components, or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

In various example embodiments, one or more portions of the network 1080 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 7G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Example 1 is a method comprising steps of receiving a set of color images of a person; generating a set of synthesized thermal images from the set of color images; and using a trained thermal image face detector to locate a human face in each of the synthesized thermal images.

In Example 2, the subject matter of Example 1 includes, generating the set of synthesized thermal images using a generator of a generative adversarial network.

In Example 3, the subject matter of Examples 1-2 may include, the set of color images having a lack of visual features based on capturing the set of color images of the person at a low brightness level.

In Example 4, the subject matter of Examples 1-3 includes, using a trained thermal image facial landmark predictor to locate facial landmarks in each of the synthesized thermal images.

In Example 5, the subject matter of Example 4 includes, analyzing the facial landmarks in the synthesized thermal images to determine facial feature movements.

In Example 6, the subject matter of Example 5 includes, facial feature movements such as eye closure or yawning.

In Example 7, the subject matter of Examples 4-6 includes, determining a direction of gaze from the facial landmarks located among the synthesized thermal images; clustering the determined direction of gaze from among the synthesized thermal images into a distribution; and determining a state of forward direction of gaze based on a predominate cluster of the distribution, wherein the state of forward direction of gaze corresponds to a centered direction in a visual field of the person.

In Example 8, the subject matter of Examples 4-7 may include, the trained thermal image face detector is trained with a set of aligned training color and thermal images, using training provided from: utilizing a face detector to detect faces in the set of training color images, wherein a detected face is located by a bounding box; transferring the bounding box of a training color image to a corresponding training thermal image to create a set of face located thermal images; and training a face detector to detect faces in thermal images using the set of face located thermal images, resulting in the trained thermal image face detector.

In Example 9, the subject matter of Example 8 may include, the trained thermal image facial landmark predictor is trained with the set of aligned training color and thermal images, the training provided from: using a model and the face located thermal images to locate facial landmarks in the set of training color images; transferring the located facial landmarks to a corresponding training thermal images to create a set of facial landmark thermal images; and training a facial landmark predictor to predict a location of facial landmarks in thermal images using the set of facial landmark thermal images, to produce the trained thermal image facial landmark predictor.

In Example 10, the subject matter of Examples 1-9 includes, identifying a state of driver operation based on the set of face located synthesized thermal images, wherein the set of color images are captured of a driver.

Example 11 is a system for locating a face in images comprising at least one processor; and memory including instructions that, when executed by the at least one processor, cause the at least one processor to: receive a set of color images of a person; generate a set of synthesized thermal images from the set of color images; and use a trained thermal image face detector to locate a human face in each of the synthesized thermal images.

In Example 12, the subject matter of Example 11 includes, a camera to capture the set of color images.

In Example 13, the subject matter of Examples 11-12 includes, operations that generate the set of synthesized thermal images uses a generator of a generative adversarial network.

In Example 14, the subject matter of Examples 11-13 may include, the set of color images having a lack of visual features based on capturing the set of color images of the person at a low brightness level.

In Example 15, the subject matter of Examples 11-14 includes, the memory further comprising instructions to: use a trained thermal image facial landmark predictor to locate facial landmarks in each of the synthesized thermal images.

Example 16 is at least one computer readable medium including instructions for locating a face in images that, when executed by at least one processor, cause the at least one processor to: receive a set of thermal images of a person; and use a trained thermal image face detector to locate a human face in each of the thermal images, wherein the trained thermal image face detector is trained to locate a human face using a set of color images of human faces and a set of thermal images corresponding to the set of color images.

In Example 17, the subject matter of Example 16 may include, the set of thermal images of the person having a lack of visual features based on capturing the set of thermal images of the person at a low brightness level.

In Example 18, the subject matter of Examples 16-17 includes, instructions to: use a trained thermal image facial landmark predictor to locate facial landmarks in each of the thermal images, wherein the trained thermal image facial landmark predictor is trained to locate facial landmarks using a set of color images of human faces and a set of thermal images corresponding to the set of color images.

In Example 19, the subject matter of Example 18 includes, instructions to: analyze the facial landmarks in the thermal images to determine facial feature movements.

In Example 20, the subject matter of Example 19 may include, the facial feature movements such as eye closure or yawning.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method comprising:
receiving a set of color images of a person;
generating, with a thermal image generator, a set of synthesized thermal images using the set of color images, wherein the thermal image generator is trained with a generative adversarial network (GAN) to generate synthesized thermal images from color images and wherein the GAN is trained with pairs of color images and corresponding target thermal images; and
using a trained thermal image face detector to locate a human face in each of the synthesized thermal images.

2. The method of claim 1, wherein the set of color images have a lack of visual features based on capturing the set of color images of the person at a low brightness level.

3. The method of claim 1, further comprising:
using a trained thermal image facial landmark predictor to locate facial landmarks in each of the synthesized thermal images.

4. The method of claim 3, further comprising:
analyzing the facial landmarks in the synthesized thermal images to determine facial feature movements.

5. The method of claim 4, wherein the facial feature movements include eye closure or yawning.

6. The method of claim 3, further comprising:
determining a direction of gaze from the facial landmarks located among the synthesized thermal images;
clustering the determined direction of gaze from among the synthesized thermal images into a distribution; and
determining a state of forward direction of gaze based on a predominate cluster of the distribution, wherein the state of forward direction of gaze corresponds to a centered direction in a visual field of the person.

7. The method of claim 3, wherein the trained thermal image face detector is trained with a set of aligned training color and thermal images, using training provided from:
utilizing a face detector to detect faces in the set of training color images, wherein a detected face is located by a bounding box;
transferring the bounding box of a training color image to a corresponding training thermal image to create a set of face located thermal images; and
training a face detector to detect faces in thermal images using the set of face located thermal images, resulting in the trained thermal image face detector.

8. The method of claim 7, wherein the trained thermal image facial landmark predictor is trained with the set of aligned training color and thermal images, the training provided from:
using a model and the face located thermal images to locate facial landmarks in the set of training color images;
transferring the located facial landmarks to a corresponding training thermal images to create a set of facial landmark thermal images; and
training a facial landmark predictor to predict a location of facial landmarks in thermal images using the set of facial landmark thermal images, to produce the trained thermal image facial landmark predictor.

9. The method of claim 1, further comprising:
identifying a state of driver operation based on the set of face located synthesized thermal images, wherein the set of color images are captured of a driver.

10. A system for locating a face in images comprising:
at least one processor; and
memory including instructions that, when executed by the at least one processor, cause the at least one processor to:
receive a set of color images of a person;
generate, with a thermal image generator, a set of synthesized thermal images using the set of color images, wherein the thermal image generator is trained with a generative adversarial network (GAN) to generate synthesized thermal images from color images and wherein the GAN is trained with pairs of color images and corresponding target thermal images; and
use a trained thermal image face detector to locate a human face in each of the synthesized thermal images.

11. The system of claim 10, further comprising a camera to capture the set of color images.

12. The system of claim 10, wherein the set of color images have a lack of visual features based on capturing the set of color images of the person at a low brightness level.

13. The system of claim 10, the memory further comprising instructions to:
use a trained thermal image facial landmark predictor to locate facial landmarks in each of the synthesized thermal images.

14. At least one non-transitory computer readable medium including instructions for locating a face in images that, when executed by at least one processor, cause the at least one processor to:
receive a set of thermal images of a person, wherein the set of thermal images are generated with a thermal image generator using a set of color images, the thermal image generator is trained with a generative adversarial network (GAN) to generate thermal images from color images and wherein the GAN is trained with pairs of color images and corresponding target thermal images; and use a trained thermal image face detector to locate a human face in each of the thermal images, wherein the trained thermal image face detector is trained to locate a human face using a set of color images of human faces and a set of thermal images corresponding to the set of color images.

15. The at least one non-transitory computer readable medium of claim 14, wherein the set of thermal images of the person have a lack of visual features based on capturing the set of thermal images of the person at a low brightness level.

16. The at least one non-transitory computer readable medium of claim 14, further comprising instructions to:
use a trained thermal image facial landmark predictor to locate facial landmarks in each of the thermal images, wherein the trained thermal image facial landmark predictor is trained to locate facial landmarks using a set of color images of human faces and a set of thermal images corresponding to the set of color images.

17. The at least one non-transitory computer readable medium of claim 16, further comprising instructions to:
analyze the facial landmarks in the thermal images to determine facial feature movements.

18. The at least one non-transitory computer readable medium of claim 17, wherein the facial feature movements include eye closure or yawning.

* * * * *